(12) United States Patent
Brockman et al.

(10) Patent No.: US 6,311,435 B1
(45) Date of Patent: Nov. 6, 2001

(54) SOFT SIDED SHELTER ASSEMBLY FOR TRUCK/TRAILER CLOSURE AT STORAGE TERMINAL DOCK

(75) Inventors: Thomas R. Brockman, Kenton; Mark Dillon, Upper Sandusky, both of OH (US)

(73) Assignee: Fairborn USA Inc., Upper Sandusky, OH (US)

( * ) Notice: Subject to any disclaimer, the term of this patent is extended or adjusted under 35 U.S.C. 154(b) by 0 days.

(21) Appl. No.: 09/422,230

(22) Filed: Oct. 21, 1999

(51) Int. Cl.[7] .................................................... E04H 14/00
(52) U.S. Cl. ...................................... 52/173.2; 52/DIG. 13
(58) Field of Search ........................... 52/173.2, DIG. 13, 52/2.12

(56) References Cited

U.S. PATENT DOCUMENTS

| | | | |
|---|---|---|---|
| 3,772,839 | * 11/1973 | Timbers | 52/173.2 |
| 4,381,631 | * 5/1983 | Frommelt | 52/173.2 |
| 4,799,342 | * 1/1989 | Klevnjans | 52/173.2 |
| 4,873,800 | 10/1989 | Frommelt. | |
| 5,185,977 | 2/1993 | Brockman. | |
| 5,333,424 | * 8/1994 | Chalfant et al. | 52/173.2 |
| 5,345,733 | 9/1994 | Brockman. | |
| 5,553,424 | * 9/1996 | Brockman et al. | 52/173.2 X |
| 5,953,868 | * 9/1999 | Giuliani et al. | 52/173.2 |
| 6,014,844 | * 1/2000 | Thill | 52/173.2 |

* cited by examiner

Primary Examiner—Peter M. Cuomo
Assistant Examiner—Jerry A. Anderson
(74) Attorney, Agent, or Firm—Birch, Stewart, Kolasch & Birch, LLP.

(57) ABSTRACT

A closure unit for providing a weather-tight seal within the doorjamb in the wall of a warehouse at a terminal dock, includes outwardly positioned left-hand and right-hand side wings having hook-and-loop fasteners thereon for removably coupling the wings to compressible side pad assemblies. A pair of bottom pad assemblies is securable to the side pad assemblies through mating apertured brackets and laces extending through the aligned apertures of the respective brackets. An independent head curtain assembly is provided with a suitable mounting bracket assembly which supports the head frame assembly separate from the side pads. Rubber straps couple the head curtain assembly to the side walls of the jamb opening in order to restrain the head curtain from movement during high-wind conditions and tension the head curtain during trailer entry. The side pad, bottom pad and head curtain assemblies are all formed with fabric-type outer shells, durable for the intended use. The side pad and bottom pad assemblies have the fabric wrapped around a compressible foam material. The side pad and head curtain assemblies also include flexible stays within the fabric to provide some rigidity to the structure to maintain its initial shape.

20 Claims, 5 Drawing Sheets

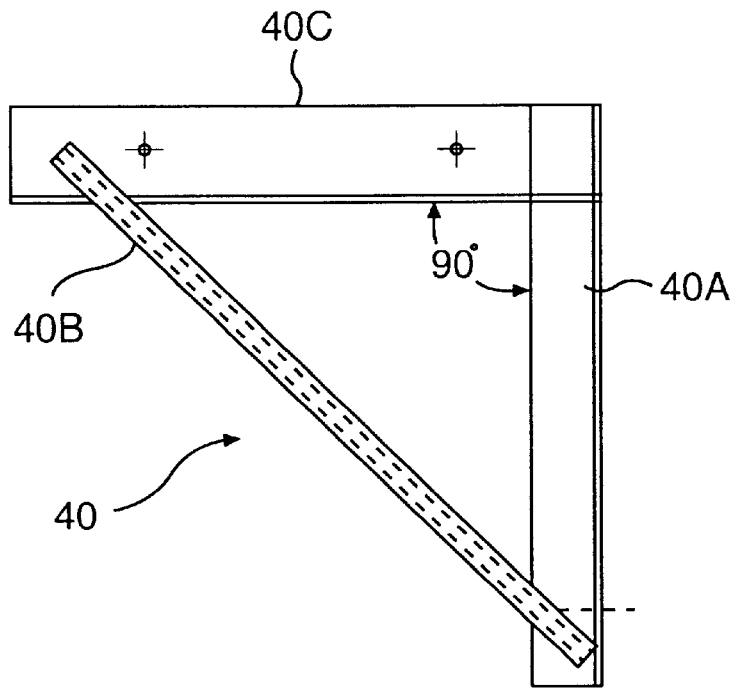
FIG. 7A
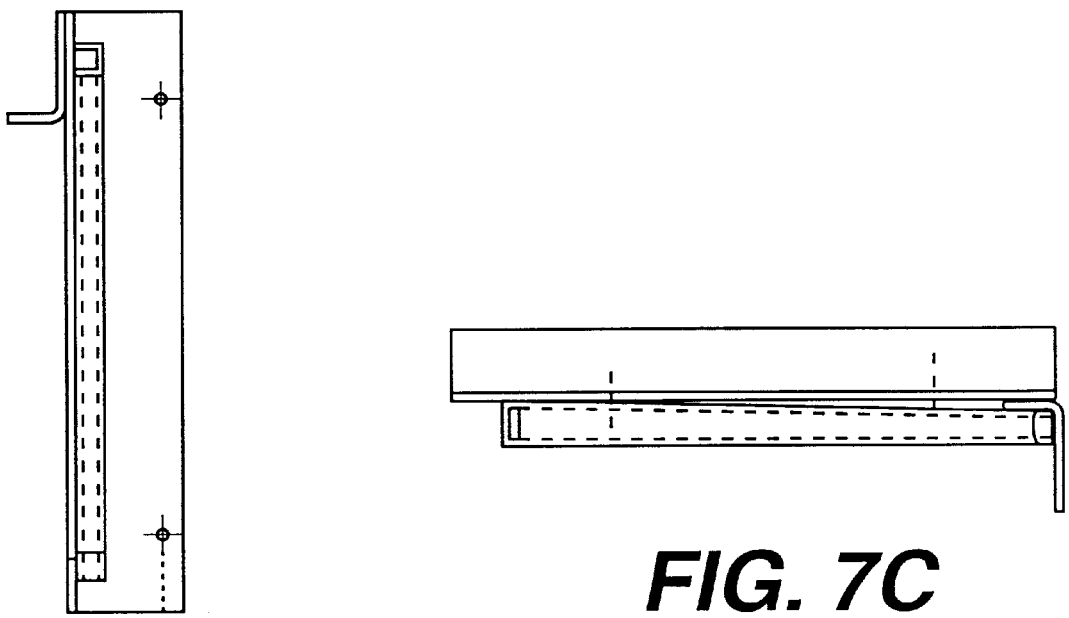
FIG. 7B
FIG. 7C

SOFT SIDED SHELTER ASSEMBLY FOR TRUCK/TRAILER CLOSURE AT STORAGE TERMINAL DOCK

BACKGROUND OF THE INVENTION

In the loading and off-loading of trucks, more specifically, tractor-trailer trucks, it is desirable to simultaneously seal the area between vehicle, terminal dock and/or shelter, against inclement weather. Likewise, it is important to provide such a combined dock seal and shelter as will be able to withstand substantial wind, weather and vehicular abuse. Accordingly, the present invention is adapted to provide at a given warehouse or building dock, a protective unit that presents a weather-resistant seal between truck/trailer and dock when the rear doors of the truck/trailer are open and parallel to sides of the vehicle. It is desirable then that such a dock shelter not only permits complete and unobstructed trailer access, but also provides outstanding weather protection.

Every time one opens a warehouse-loading door to gain access to a tractor-trailer, there is an exchange of inside and outside air that causes building energy loss. With an open, unsealed 8'×8' loading door, this may currently cost some thousands of dollars a year per door in heating energy loss, and in excess of a thousand dollars a year per door in air conditioning energy loss.

A conventional terminal building usually has multiple dock doors with appropriate vehicle bumpers below the dock. The building doors may have no side frames, the respective door openings simply comprising a loading-unloading cavity in the wall, with or without a vertically sliding door. It is to such building docks that the present invention applies.

SUMMARY OF THE INVENTION

Accordingly, it is a primary object of the present invention to provide an improved gap closure unit for a terminal dock, which provides an improved compressible weather seal about the jamb of the wall opening in the terminal building.

It is another object of the present invention to provide an improved seal for a closure unit of a terminal dock, which is lightweight, and easy to assemble on site.

It is a further object of the present invention to provide a gap closure unit having separable parts which are readily replaceable at low cost.

These and other objects of the present invention are fulfilled by providing a wall mounted gap closure unit for a terminal dock in a warehouse or the like that includes outwardly positioned left-hand and right-hand side wings, each wing having a free end and an anchor end. Side pad assemblies secured to each sidewall of the doorjamb, the side pad assemblies include a rigid frame, a fabric shell, and a compressible foam core. Hook-and-loop fasteners are disposed between the side pad assemblies and the anchor end of the side wings for removably coupling the side wings to the side pad assemblies.

The closure unit also includes a head curtain assembly disposed in a top wall of the door jamb, including a header beam having distal ends thereof secured and supported on brackets adjacent the fabric shell of the side pad assemblies, and a head curtain depending therefrom into the gap. Resilient straps are provided to flexibly connect the head curtain to the side pad assemblies to thereby restrain the head curtain from movement during high wind conditions and tensioning the head assembly during trailer entry.

The closure unit further includes a pair of bottom pad assemblies removably secured to bottom portions of the side pad assemblies. The bottom pad assemblies preferably have a fabric shell and a compressible foam core.

The side pad assemblies preferably include at least one bottom pad support (fabric) bracket affixed to opposed surfaces of the respective side pad assemblies in the jamb opening. The brackets have spaced apertures for accommodating laces. The bottom pads have mating (fabric) brackets thereon and corresponding apertures so that the laces can extend through the aligned apertures of the respective brackets on the side and bottom pad assemblies for facilitating easy and quick removal of the bottom pads from the side pads.

The closure unit further includes protruding flaps from each side curtain which form a U-shaped channel for engaging the region of leading edges of the side pad assemblies. A portion of the hook-and-loop fastener material is disposed on the side pad assemblies. The flaps have cooperating hook-and-loop fastener material on the interior walls thereof for coupling the side curtains to the side pad assemblies in a readily removable fashion.

In a preferred embodiment each side wing includes resilient stays, each of which are secured transversely to the wing in a vertically spaced array of the wing, the stays being further secured in position by mechanical fasteners to ridgidized wing stiffeners, the stiffeners secured within respective wings in a longitudinal dimension at ends thereof, the stiffeners being longitudinally coextensive with corresponding jamb side walls of the door and the horizontal dimension of the stays in respective wings likewise being coextensive with the gap to be closed.

Further scope of the applicability of the present invention will become apparent from the detailed description given hereinafter. However, it should be understood that the detailed description and specific examples, while indicating preferred embodiment of the invention, are given by way of illustration only, since various changes and modification within the spirit and scope of the invention will become apparent to those skilled in the art from this detailed description.

BRIEF DESCRIPTION OF THE DRAWINGS

The objects of the present invention and the attendant advantages thereof will become more readily apparent by reference to the drawings wherein:

FIG. 1 is a front elevational view of the closure unit of the present invention installed within the doorjamb opening of a terminal dock in the wall of a warehouse or the like;

FIGS. 7A, 7B, 7C depict the head frame support brackets of the present invention in, side elevation, front elevation, and top plan respectively.

DETAILED DESCRIPTION OF PREFERRED EMBODIMENTS

Figure 1:
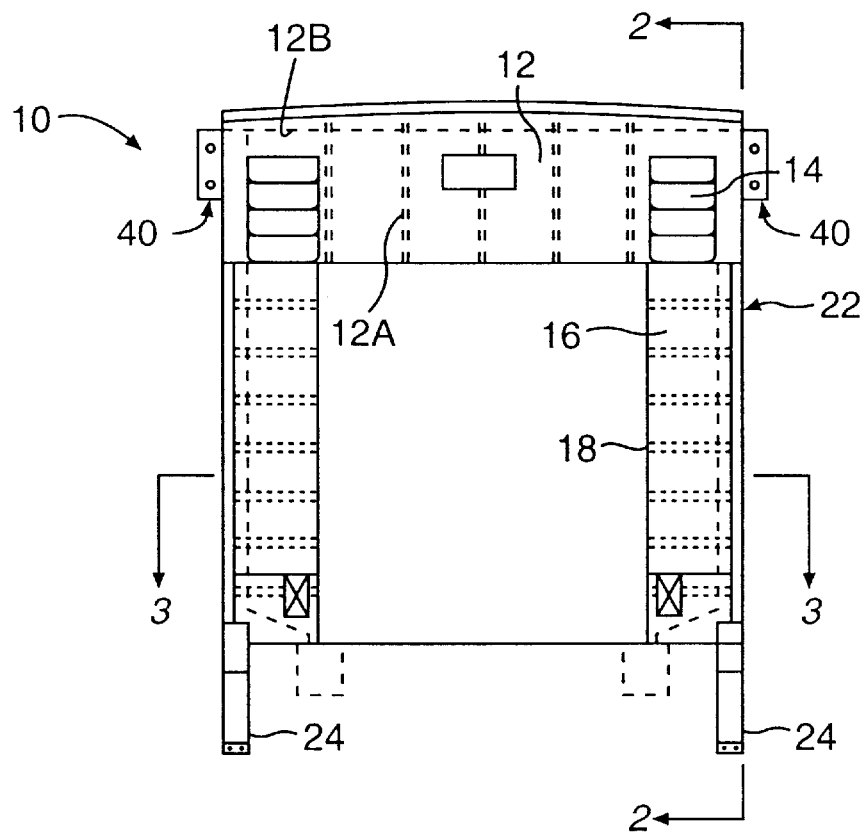
Figure 3:
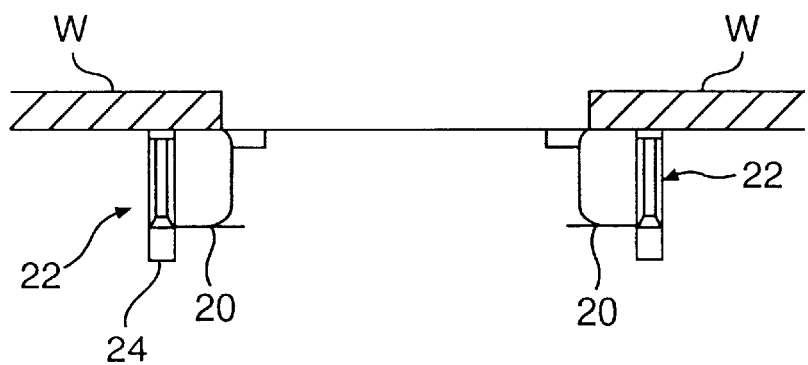
FIG. 3 is a top sectional view taken along line 3—3 of FIG. 1.
Figure 2:
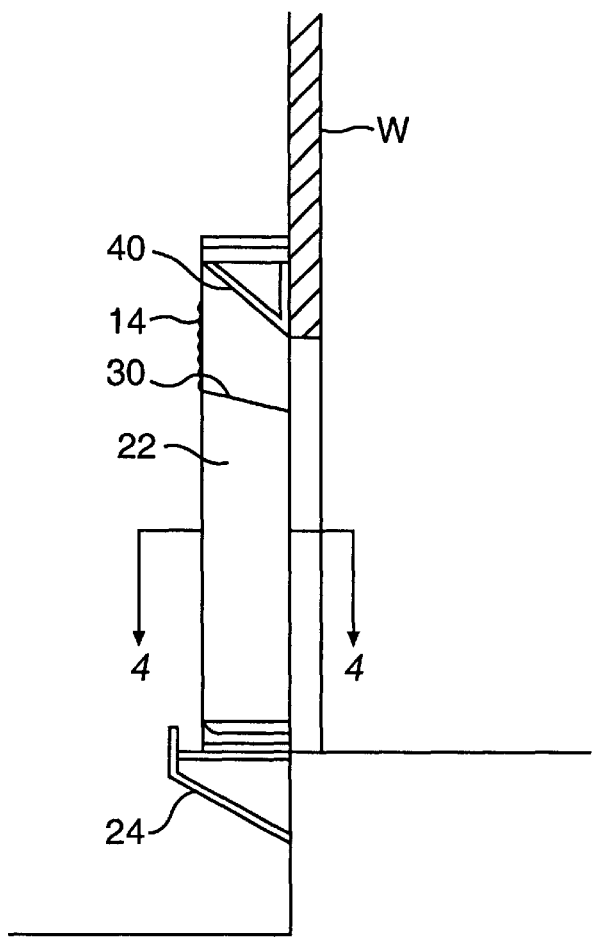
FIG. 2 is a section taken along line 2—2 of FIG. 1 of the closure unit and the wall of the warehouse.

Referring to FIGS. 1–3, there is illustrated the closure unit 10 or shelter assembly of the present invention, including a head curtain assembly 12, armor pleats 14 on an obverse face thereof serving as shock absorbing bumpers. The shelter assembly also incorporates side curtain assemblies including side curtains 16, horizontal stays 18, side pad assemblies 22, and bottom pads 20. Also disposed adjacent to the bottom corners of the door jamb opening in wall W of the building or warehouse are optional steel guards 24.

Figure 4:
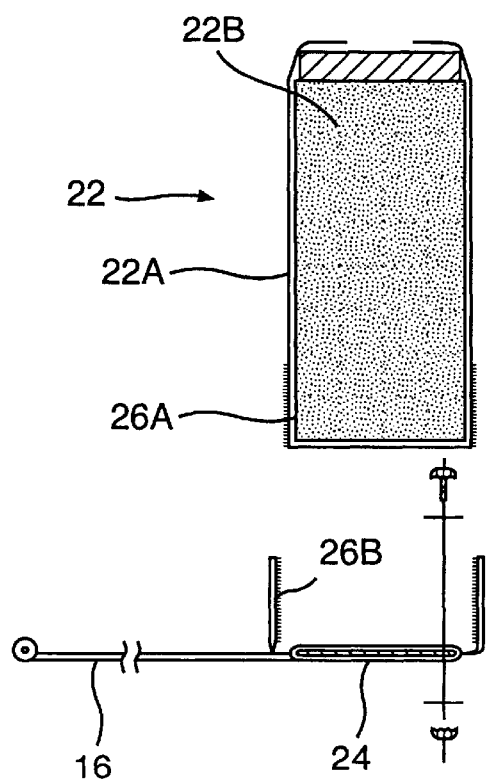
FIG. 4 is an exploded, cross-sectional view taken along line 4—4 of FIG. 2 of a side pad assembly of the present invention and an associated wing or curtain illustrating the coupling of the parts by the use of mechanical and hook-and-loop fasteners.

Further details of the side pad assemblies 22 are depicted in the cross-sectional, exploded view of FIG. 4. As illustrated therein, the side pad assembly is formed with a side pad having compressible foam core 22B, which is wrapped with a fabric cover 22A. The rear edge of the side pad assembly 22 includes a rigid stiffener or frame along the interior vertical edge of the side pad assembly. The leading edge of each side pad assembly carries on the inner and outer edges a strip of hook-and-loop fastener material. A suitable material is available under the VELCRO trademark. As illustrated in FIG. 4, the hook or loop strip 26A is disposed along the leading edge or corner of the side pad assembly for coupling to the complementary hook or loop fastener material 26B disposed on flaps extending from the side curtain assembly 16.

Side curtain 16 includes a vertical stiffener 24 running substantially coextensive with the entire height of the side pad assembly in between the extending flaps containing the hook-and-loop fastener material 26B. The protruding portion of the side curtain 16 is comprised of vertically spaced apart stays fabricated from material such as laminated fiberglass to provide a flexible, but semi-rigid structure, which interacts with the back corners of the truck or trailer being positioned within the door jamb of the terminal dock. The side curtain 16 forms a weatherproof seal between the sidewalls of the trailer or truck in conjunction with the head curtain assembly 12.

Accordingly, as depicted in FIG. 4, the side curtains 16 may be quickly and readily attached to the side pad assemblies through the use of the cooperating hook-and-loop fastener material 26A, 26B in order to assemble the closure unit on site or disassemble the same for the purpose of easily replacing worn or damaged parts.

Figure 5:
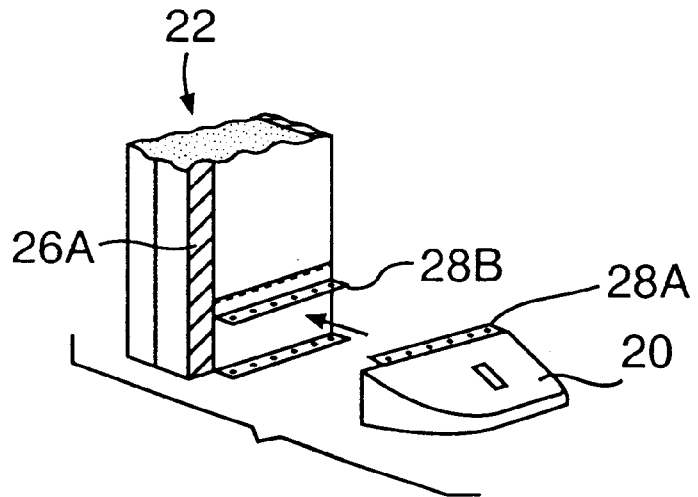
FIG. 5 is an exploded view depicting how the bottom pad assemblies of the closure unit may be removably coupled to the side pad assemblies through the use of laces fed through aligned apertures in flaps disposed on the respective parts.
Figure 5A:
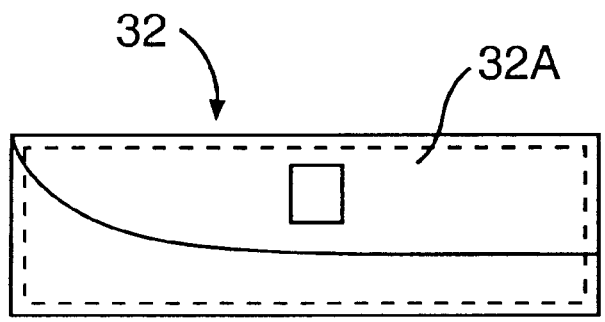
FIG. 5A is an elevational view of a bottom pad assembly disposed within a fabric-wrapped outer shell.

FIG. 5 depicts, in the exploded view thereof, the manner in which the bottom pads 20 are readily connected to the side pad assemblies 22. Fabric flaps 28A are provided on each bottom pad assembly and mating flaps 28B on the side pad assembly 22. Each flap contains apertures which are aligned so that laces may be extended through the aligned apertures in order to removably secure the bottom pad assemblies 20 to the side pad assemblies 22. As illustrated in FIG. 5A, the bottom pad assemblies are disposed within a fabric-wrapped outer shell 32 which may be stitched to or secured in any other suitable manner about a compressible foam core 32A. Accordingly, bottom pads 20 are flexible and compressible in order to absorb shocks associated with contact with the rear of a truck or trailer and are capable of conforming to the shape of the truck at the points of engagement in order to provide a weather-tight seal.

Referring again to FIG. 1, and specifically to the structure of the head curtain assembly 12, the curtain has vertical stays 12A sewn within channel-forming pockets in the curtain material. The curtain material is a coated fabric and the stays may be laminated fiberglass, identical to the stays 18 of the side pad assemblies. The head curtain assembly 12 is mounted at the top to a header 12B such as a beam of pressure-treated lumber. The bottom of the head frame assembly is supported at the base at the right and left corners as depicted in FIG. 1 by the head-frame support bracket assembly illustrated in FIGS. 7A–7C. The head-frame support bracket is generally designated 40 and includes intersecting corner bracket portions 40A, 40B and 40C. The rear portion 40A, as illustrated in FIG. 7A, is secured through screws or the like to the right wall of the doorjamb in wall W of the building, and the top portion 40C extends under the end of the head frame transversely to the rear portion 40A. A diagonal bracing portion 40B is provided to give additional strength to the head-frame support bracket assembly. The bracket assembly 40 permits mounting of the head-frame assembly and operation thereof independent of the adjacent side pads 22.

Figure 6A:
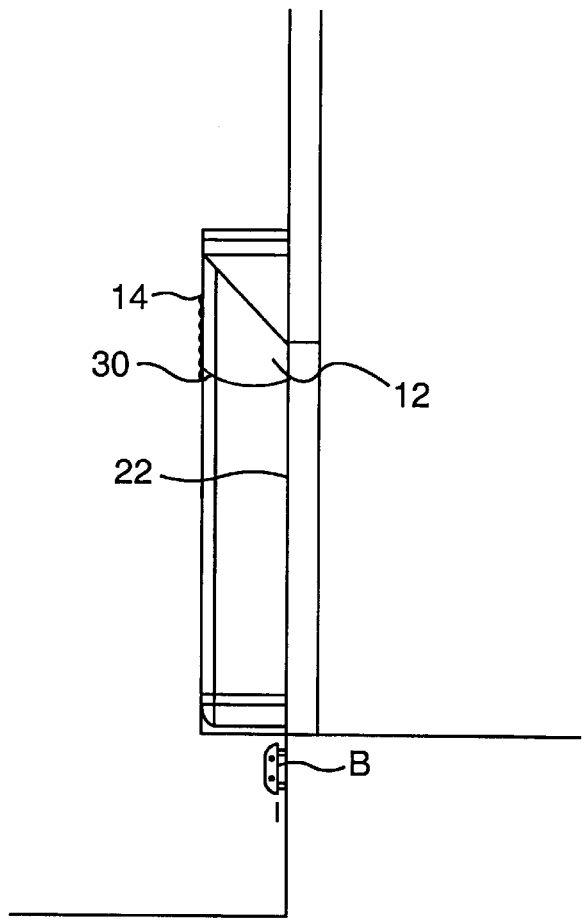
FIG. 6A is a side elevational view of one embodiment of the closure unit of the present invention showing a straight profile.

The side pads 22 may have different profiles depending on the type of terminal dock opening in which they are inserted. In one embodiment illustrated in FIG. 6A the side pad assembly has a straight profile as viewed from the side elevation while in FIG. 6B the side pad assembly 22 is tapered and flares out from top to bottom. In each of these embodiments a bumper B of any suitable type is provided at the bottom of the opening across its transverse width.

As described above and depicted in the drawings the side curtains 16 are provided with spaced horizontal fiberglass stays and are attached to the side pads 22 with hook-and-loop fasteners 26A, 26B. The side curtains 16 also include a vertical PVC stiffener 24 serving as reinforcement via mechanical fasteners for the fiberglass stay arrangement. The fabric covered foam side pad assemblies are used in concert with a rigid (pressure-treated wood) header 12B, which is covered with a translucent fiberglass shell material.

The fabric covered foam bottom pads 20 in conjunction with the side pad assemblies 22 and the head curtain assembly 12 provide a compressible weather tight seal about the perimeter of the doorjamb in the wall W of the warehouse.

In operation, when a truck or trailer is backed into the doorjamb opening of the terminal dock, the compressible and flexible components of the closure unit assembly of the present invention flex and conform to the exterior walls of the back of the truck or trailer in order to provide the weather tight seal.

Figure 6B:
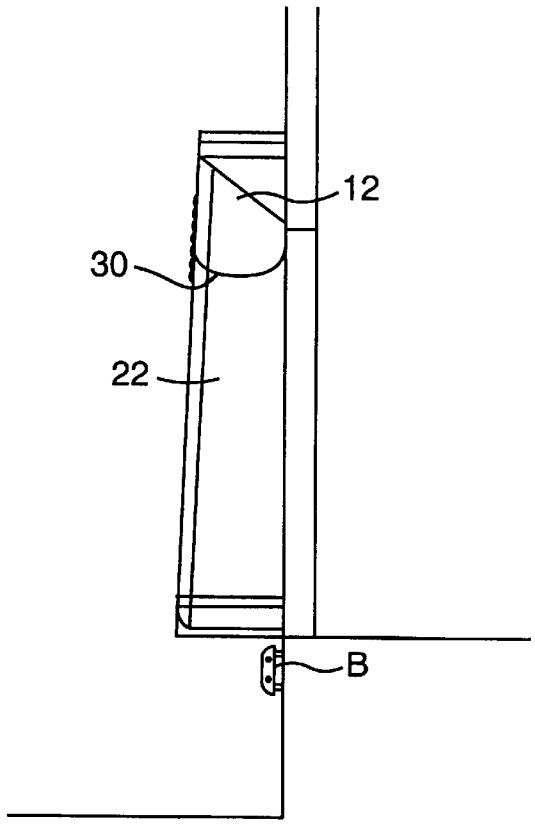
FIG. 6B is a side elevational view of another embodiment of the closure unit of the present invention showing a tapered profile.

Also as depicted in FIG. 6B, a flexible rubber connector or strap 30 with S-hooks at the respective distal ends is utilized at each lower end of the head curtain 12 to attach to the side frames of the unit. These flexible rubber connectors serve to restrain head curtain movement during high wind conditions and serve as a head curtain tensioning assembly during trailer entry.

The invention being thus described, it will be obvious that the same may be varied in many ways. Such variations are not to be regarded as a departure from the spirit and scope of the invention, and all such modification as would be obvious to one skilled in the art are intended to be included within the scope of the following claims.

What is claimed is:

1. A shelter assembly for installation to building wall about a dock opening, the shelter assembly, when installed about the dock opening, providing a shelter about the end of a truck/trailer body docked at the dock opening, the shelter assembly comprising:

a head curtain assembly including (1) a rigid frame adapted for fastening to the building wall above and transversely across the dock opening, the frame, when fastened to the building, projecting forwardly away from the building wall and (2) a flexible head curtain fastened along a top edge to the frame; said rigid frame of the head curtain assembly includes a pair of transversely spaced brackets and a transversely extending beam having one end thereof supported by one of the brackets and the other end thereof supported by the other bracket; and wherein the beam provides a surface for fastening the top edge of the head curtain;

a side curtain assembly adapted for installation to the building wall along each side of the dock opening, each side curtain assembly comprising (1) an elongated side pad assembly including (a) a rigid base adapted for fastening to the building wall along a side of the dock opening and (b) a deformable side pad projecting forwardly from the base, (2) a side curtain of flexible material, the side curtain having (a) an outer side region thereof removably fastened to the side pad and (b) a free inner side edge and (3) a deformable bottom pad projecting transversely inwardly from, and being removably fastened to, an inner side surface of the side pad adjacent the bottom thereof.

2. The shelter assembly as recited in claim 1, wherein:

each side curtain incorporates (1) rearwardly extending flaps forming a U-shaped channel with sides thereof extending along inner and outer sides of the side pad, (2) a stiffener extending between the top and bottom of the side curtain between the flaps thereof and (3) a plurality of transversely extending resilient stays spaced from each other between the top and bottom of the side curtain, the outer ends of the stays being fastened to the stiffener; and hook-and-loop fastener material is provided on confronting surfaces of the channel sides and the side pad for removably fastening the curtain to the side pad.

3. The shelter assembly as recited in claim 1, wherein:

each of the deformable side pads includes at least one flap fastened to the inner side surface of the side pad, the flap having spaced apertures;

each of the bottom pads comprises at least one flap for mating with the flap of the side pad, the flap of the bottom pad having spaced apertures and being fastened to an outer side surface of the bottom pad that confronts the inner side surface of the adjoining side pad; and lacing extending through aligned apertures of mating flaps on the bottom pad and the side pad for removably fastening the bottom pad to the side pad.

4. The shelter assembly as recited in claim 1, and further comprising a cover of translucent material extending over a top surface of the frame.

5. The shelter assembly as recited in claim 1, and further comprising a resilient strap provided at each side of the shelter assembly, each strap having one end attached to an outer side of the side pad assembly and the other end attached to an adjacent lower outside corner of the head curtain for thereby restraining movement of the head curtain during high wind conditions and tensioning the head curtain during entry of the truck/trailer body.

6. The shelter assembly as recited in claim 1, wherein the forward projection of each side pad from the base is uniform from the top to the bottom of the side pad.

7. The shelter assembly as recited in claim 1, wherein the forward projection of each side pad from the base increases from the top to the bottom of the side pad.

8. A shelter assembly for installation to building wall about a dock opening, the shelter assembly, when installed about the dock opening, providing a shelter about the end of a truck/trailer body docked at the dock opening, the shelter assembly comprising:

a head curtain assembly including (1) a rigid frame adapted for fastening to the building wall above and transversely across the dock opening, the frame, when fastened to the building, projecting forwardly away from the building wall and (2) a flexible head curtain fastened along a top edge to the frame;

a side curtain assembly adapted for installation to the building wall along each side of the dock opening, each side curtain assembly comprising (1) an elongated side pad assembly including (a) a rigid base adapted for fastening to the building wall along a side of the dock opening and (b) a deformable side pad projecting forwardly from the base, a forward projection of each side pad from the base increases from the top to the bottom of the side pad, (2) a side curtain of flexible material, the side curtain having (a) an outer side region thereof removably fastened to the side pad and (b) a free inner side edge and (3) a deformable bottom pad projecting transversely inwardly from, and being removably fastened to, an inner side surface of the side pad adjacent the bottom thereof.

9. The shelter assembly as recited in claim 8, wherein:

each side curtain incorporates (1) rearwardly extending flaps forming a U-shaped channel with sides thereof extending along inner and outer sides of the side pad, (2) a stiffener extending between the top and bottom of the side curtain between the flaps thereof and (3) a plurality of transversely extending resilient stays spaced from each other between the top and bottom of the side curtain, the outer ends of the stays being fastened to the stiffener; and hook-and-loop fastener material is provided on confronting surfaces of the channel sides and the side pad for removably fastening the curtain to the side pad.

10. The shelter assembly as recited in claim 8, wherein:

each of the deformable side pads includes at least one flap fastened to the inner side surface of the side pad, the flap having spaced apertures;

each of the bottom pads comprises at least one flap for mating with the flap of the side pad, the flap of the bottom pad having spaced apertures and being fastened to an outer side surface of the bottom pad that confronts the inner side surface of the adjoining side pad; and lacing extending through aligned apertures of mating flaps on the bottom pad and the side pad for removably fastening the bottom pad to the side pad.

11. The shelter assembly as recited in claim 8, wherein:

the rigid frame of the head curtain assembly includes a pair of transversely spaced brackets and a transversely extending beam having one end thereof supported by one of the brackets and the other end thereof supported by the other bracket; and wherein the beam provides a surface for fastening the top edge of the head curtain.

12. The shelter assembly as recited in claim 8, and further comprising a cover of translucent material extending over a top surface of the frame.

13. The shelter assembly as recited in claim 8, and further comprising a resilient strap provided at each side of the shelter assembly, each strap having one end attached to an outer side of the side pad assembly and the other end attached to an adjacent lower outside corner of the head curtain for thereby restraining movement of the head curtain during high wind conditions and tensioning the head curtain during entry of the truck/trailer body.

14. A shelter assembly for installation to a building wall about a dock opening, the shelter assembly, when installed about the dock opening, providing a shelter about the end of a truck/trailer body docked at the dock opening, the shelter assembly comprising:

- a head curtain assembly including (1) a rigid frame adapted for fastening to the building wall above and transversely across the dock opening, the frame, when fastened to the building, projecting forwardly away from the building wall and (2) a flexible head curtain fastened along a top edge to the frame;
- a side curtain assembly adapted for installation to the building wall along each side of the dock opening, each side curtain assembly comprising (1) an elongated side pad assembly including (a) a rigid base adapted for fastening to the building wall along a side of the dock opening and (b) a deformable side pad projecting forwardly from the base, (2) a side curtain of flexible material, the side curtain having (a) an outer side region thereof removably fastened to the side pad and (b) a free inner side edge and (3) a deformable bottom pad projecting transversely inwardly from, and being removably fastened to, an inner side surface of the side pad adjacent the bottom thereof;
- each of the deformable side pads includes at least one flap fastened to the inner side surface of the side pad, the flap having spaced apertures;
- each of the bottom pads comprises at least one flap for mating with the flap of the side pad, the flap of the bottom pad having spaced apertures and being fastened to an outer side surface of the bottom pad that confronts the inner side surface of the adjoining side pad; and
- lacing extending through aligned apertures of mating flaps on the bottom pad and the side pad for removably fastening the bottom pad to the side pad.

15. The shelter assembly as recited in claim 14, wherein:

each side curtain incorporates (1) rearwardly extending flaps forming a U-shaped channel with sides thereof extending along inner and outer sides of the side pad, (2) a stiffener extending between the top and bottom of the side curtain between the flaps thereof and (3) a plurality of transversely extending resilient stays spaced from each other between the top and bottom of the side curtain, the outer ends of the stays being fastened to the stiffener; and hook-and-loop fastener material is provided on confronting surfaces of the channel sides and the side pad for removably fastening the curtain to the side pad.

16. The shelter assembly as recited in claim 14, wherein the forward projection of each side pad from the base increases from the top to the bottom of the side pad.

17. The shelter assembly as recited in claim 14, wherein:

the rigid frame of the head curtain assembly includes a pair of transversely spaced brackets and a transversely extending beam having one end thereof supported by one of the brackets and the other end thereof supported by the other bracket; and wherein the beam provides a surface for fastening the top edge of the head curtain.

18. The shelter assembly as recited in claim 14, and further comprising a cover of translucent material extending over a top surface of the frame.

19. The shelter assembly as recited in claim 14, and further comprising a resilient strap provided at each side of the shelter assembly, each strap having one end attached to an outer side of the side pad assembly and the other end attached to an adjacent lower outside corner of the head curtain for thereby restraining movement of the head curtain during high wind conditions and tensioning the head curtain during entry of the truck/trailer body.

20. The shelter assembly as recited in claim 14, wherein the forward projection of each side pad from the base is uniform from the top to the bottom of the side pad.

* * * * *